United States Patent
Kammerer et al.

(10) Patent No.: US 12,126,255 B2
(45) Date of Patent: Oct. 22, 2024

(54) METHOD FOR PRECHARGING MODULES OF A MODULAR MULTILEVEL CONVERTER

(71) Applicant: Siemens Energy Global GmbH & Co. KG, Munich (DE)

(72) Inventors: Felix Kammerer, Erlangen (DE); Sebastian Semmler, Nuremberg (DE)

(73) Assignee: Siemens Energy Global GmbH & Co. KG, Munich (DE)

(*) Notice: Subject to any disclaimer, the term of this patent is extended or adjusted under 35 U.S.C. 154(b) by 214 days.

(21) Appl. No.: 17/638,949

(22) PCT Filed: Aug. 27, 2019

(86) PCT No.: PCT/EP2019/072860
§ 371 (c)(1),
(2) Date: Feb. 28, 2022

(87) PCT Pub. No.: WO2021/037346
PCT Pub. Date: Mar. 4, 2021

(65) Prior Publication Data
US 2022/0302852 A1    Sep. 22, 2022

(51) Int. Cl.
*H02M 1/36* (2007.01)
*H02M 1/08* (2006.01)
(Continued)

(52) U.S. Cl.
CPC .............. *H02M 1/36* (2013.01); *H02M 1/08* (2013.01); *H02M 7/4835* (2021.05); *H02M 7/53871* (2013.01); *H02M 7/483* (2013.01)

(58) Field of Classification Search
CPC ........ H02M 1/36; H02M 7/4835; H02M 1/08; H02M 7/53871; H02M 7/483
See application file for complete search history.

(56) References Cited

U.S. PATENT DOCUMENTS

| | | | |
|---|---|---|---|
| 10,763,761 B2 | 9/2020 | Ding et al. | |
| 2019/0326770 A1* | 10/2019 | Ding | H02J 7/00 |

FOREIGN PATENT DOCUMENTS

| | | |
|---|---|---|
| EP | 3276815 A1 | 1/2018 |
| EP | 2933906 B1 | 10/2018 |
| WO | WO 2018130205 A1 | 7/2018 |

OTHER PUBLICATIONS

Ang Li et al: AC- and DC-Side Start-Up Strategies for Half-/Full-Bridge Hybrid Modular Multilevel Converter; State Key Laboratory of Advanced Electromagnetic Engineering and Technology, School of Electrical and Electronic Engineering, Huazhong University of Science and Technology, Wuhan, China; p. 3121-3126; 978-1-5386-1180-7/18/$31.00 © 2018 IEEE; 2018.
(Continued)

*Primary Examiner* — Rafael O De Leon Domenech
(74) *Attorney, Agent, or Firm* — Laurence A. Greenberg; Werner H. Stemer; Ralph E. Locher (57) ABSTRACT

A method for precharging half bridge modules and full bridge modules of a modular multilevel converter includes providing the modular multilevel converter with at least one phase module branch with half bridge modules and full bridge modules connected electrically in a series circuit, and each of the half bridge modules and full bridge modules having at least first and second module connections, two electronic switching elements and an electrical energy store. In a first charging phase after connecting the multilevel converter to an energy supply network with the electronic switching elements of the half bridge modules and the full bridge modules not actuated, the energy stores of the half bridge modules and the full bridge modules are charged in an uncontrolled manner. In a second charging phase, the
(Continued)

electronic switching elements of at least some full bridge modules are actuated such that the half bridge modules are charged further.

16 Claims, 6 Drawing Sheets

(51) Int. Cl.
*H02M 7/483* (2007.01)
*H02M 7/5387* (2007.01)

(56) References Cited

OTHER PUBLICATIONS

Zeng Rong et al: "Precharging and DC Fault Ride-Through of Hybrid MMC-Based HVDC Systems", IEEE Transactions on Power Delivery, IEEE Service Center, New York, NY, US, vol. 30, No. 3, 1. Jun. 2015, pp. 1298-1306, XP011582056, ISSN: 0885-8977, DOI: 10.1109/TPWRD.2014.2360042; 2015.

* cited by examiner

METHOD FOR PRECHARGING MODULES OF A MODULAR MULTILEVEL CONVERTER

FIELD AND BACKGROUND OF THE INVENTION

The invention relates to a method for precharging half bridge modules and full bridge modules of a modular multilevel power converter. Half bridge modules and full bridge modules of a modular multilevel power converter comprise at least two electronic switching elements and an electrical energy store. The electrical energy store is often configured as a capacitor. Before the beginning of rated operation of the multilevel power converter, that is to say before the beginning of energy conversion or energy transmission, the electrical energy stores of the half bridge modules and of the full bridge modules have to be precharged. The multilevel power converter can commence its rated operation only when the energy stores of the individual modules are precharged in each case to a specific voltage. This voltage can be for example a minimum voltage sufficient for the internal voltage supply of the modules. This is because the voltage necessary for the internal voltage supply is often provided by the energy store of the respective module.

If a multilevel power converter comprises both half bridge modules and full bridge modules, then there is the additional problem that the energy stores of half bridge modules and of full bridge modules become charged differently on account of the different constructions of these modules.

SUMMARY OF THE INVENTION

The invention is based on the object of specifying a method and a multilevel power converter with which the energy stores of the half bridge modules and also the energy stores of the full bridge modules can be precharged in a controlled manner before the beginning of rated operation of the multilevel power converter.

This object is achieved according to the invention by means of a method and by means of a modular multilevel power converter as claimed in the independent patent claims. Advantageous configurations of the method are specified in the dependent patent claims.

What is disclosed is a method for (initially) precharging half bridge modules and full bridge modules of a modular multilevel power converter (before the beginning of rated operation of the multilevel power converter), wherein the modular multilevel power converter comprises at least one phase module branch having half bridge modules and full bridge modules electrically connected in a series circuit, and wherein each of the half bridge modules and full bridge modules comprises at least a first module connection, a second module connection, two electronic switching elements and an electrical energy store, wherein in the method
  in a first charging phase after the multilevel power converter has been connected to an energy supply network with electronic switching elements of the half bridge modules and of the full bridge modules not being driven, the energy stores of the half bridge modules and of the full bridge modules are charged in an uncontrolled manner, and
  in a second charging phase, the electronic switching elements of at least some of the full bridge modules are driven in such a way that the half bridge modules are charged further.

In this case, the energy supply network is preferably an AC voltage energy supply network. In this case, it is advantageous and surprising that in the second charging phase, the electronic switching elements of at least some of the full bridge modules are driven in order to charge the half bridge modules further. This makes use of the knowledge that in the first charging phase (i.e. during the uncontrolled charging of the energy stores of the half bridge modules and of the full bridge modules), the energy stores of the full bridge modules are charged to a higher voltage than the energy stores of the half bridge modules. The reason for this is that in the case of the full bridge modules both half-cycles of the AC voltage lead to the charging of the energy store, while in the case of the half bridge modules only one half-cycle of the AC voltage leads to the charging of the energy store. Therefore, the full bridge modules are ready for use (i.e. drivable) at an earlier time than the half bridge modules, such that the charging process of the energy stores of the half bridge modules can be influenced at the beginning of the second charging phase by means of the driving of the full bridge modules. This even functions already at a time when the half bridge modules are not yet ready for use (i.e. not drivable) because the voltage of their energy stores is still too low.

The method can proceed such that the number of half bridge modules and full bridge modules of the series circuit is selected such that in the first charging phase, the energy stores of the full bridge modules are charged to an extent such that at the end of the first charging phase, the voltage of the energy stores of the full bridge modules is sufficiently high for the internal voltage supply of the full bridge modules. In particular, at the end of the first charging phase, the voltage of the energy stores of the full bridge modules is sufficiently high for the voltage supply of an electronic circuit arranged (additionally) in each case in the full bridge modules. Such an electronic circuit can be a module control device, in particular. To put it another way, at the end of the first charging phase, the voltage of the energy stores of the full bridge modules is greater than a minimum voltage necessary for the internal voltage supply of the full bridge modules. In this case, the minimum voltage is in particular the voltage which is (at least) necessary for the internal voltage supply for the electronic circuit arranged (additionally) in each case in the full bridge modules. The full bridge modules are thus drivable at the end of the first charging phase.

Since the charging proceeds in an uncontrolled manner in the first charging phase, the number of half bridge modules and full bridge modules of the series circuit must be selected such that the network voltage (for example AC voltage) occurring at the energy supply network is sufficient for charging the energy stores of the full bridge modules to a sufficient extent, such that the full bridge modules are ready for use (i.e. drivable) at the end of the first charging phase.

The method can also proceed such that
  in the second charging phase, the electronic switching elements of at least some of the full bridge modules are driven in such a way that the current flowing through these full bridge modules is substantially conducted past the respective energy store of these full bridge modules and, as a result, substantially the voltage zero (zero voltage) occurs between the first and second module connections of these full bridge modules.

As a result, a greater (effective) voltage is available in particular for the charging of the half bridge modules of the series circuit, whereby the half bridge modules are charged further. Moreover, a further charging of the respective energy store of these full bridge modules is substantially avoided or limited.

The method can proceed such that in the second charging phase, the electronic switching elements of the half bridge modules remain undriven. As a result, the second charging phase can be started already when only the full bridge modules are drivable, but the half bridge modules are not yet drivable, i.e. are undrivable.

The method can also proceed such that in the second charging phase, the energy stores of the half bridge modules are charged until the energy stores of the half bridge modules have a first preselected voltage.

In this case, the first preselected voltage can be selected such that this first preselected voltage is sufficiently high for the internal voltage supply of the half bridge modules. In particular, at the end of the second charging phase, the voltage of the energy stores of the half bridge modules is sufficiently high for the voltage supply of an electronic circuit arranged (additionally) in each case in the half bridge modules. Such an electronic circuit can be a module control device, in particular. To put it another way, the first preselected voltage is selected such that it is greater than or equal to a minimum voltage which is sufficient for the internal voltage supply for the electronic circuit arranged (additionally) in each case in the half bridge modules.

The method can also proceed such that in a third charging phase, the electronic switching elements of the half bridge modules and the electronic switching elements of the full bridge modules are driven in such a way that both the energy stores of the half bridge modules and the energy stores of the full bridge modules are charged further (in a controlled manner).

As a result, the energy stores of the half bridge modules and the energy stores of the full bridge modules can be charged in each case to a desired voltage value.

The method can proceed such that in the third charging phase, the electronic switching elements of the half bridge modules and the electronic switching elements of the full bridge modules are charged further (in a controlled manner) until the energy stores of the half bridge modules have a second preselected voltage and the energy stores of the full bridge modules have a third preselected voltage. In particular, the second preselected voltage and the third preselected voltage can be substantially equal in magnitude.

The method can proceed such that the second preselected voltage corresponds to the rated voltage of the half bridge modules and/or the third preselected voltage corresponds to the rated voltage of the full bridge modules. As soon as the energy stores of the half bridge modules and the energy stores of the full bridge modules have each attained their rated voltage, the precharging of the modules can be ended.

The method can proceed such that (in the first charging phase, the second charging phase and/or the third charging phase), the energy stores are charged via an (ohmic) precharge resistor that can be arranged in particular between the energy supply network and the multilevel power converter. The charging current is limited by means of the precharge resistor.

The method can proceed such that after the completion of the third charging phase, the precharge resistor is electrically bridged (by means of a bridging device) (as a result of which said precharge resistor is inactive during subsequent rated operation of the multilevel power converter). Electrical losses during rated operation of the multilevel power converter are avoided as a result.

The method can proceed such that the half bridge modules each comprise the two electronic switching elements in a half bridge circuit.

The method can also proceed such that the full bridge modules each comprise the two electronic switching elements and two further electronic switching elements in a full bridge circuit.

What is furthermore disclosed is a modular multilevel power converter having at least one phase module branch comprising a series circuit formed by half bridge modules and full bridge modules, wherein each of the half bridge modules and full bridge modules comprises at least a first module connection, a second module connection, two electronic switching elements and an electrical energy store, wherein the multilevel power converter is configured for carrying out the methods specified above.

The methods described and the modular multilevel power converter described have identical advantages or the same type of advantages. They are in particular the advantages specified above in association with the method.

The invention is explained in greater detail below on the basis of exemplary embodiments. In this case, identical reference signs refer to identical or identically acting elements.

DETAILED DESCRIPTION OF THE INVENTION

Figure 1:
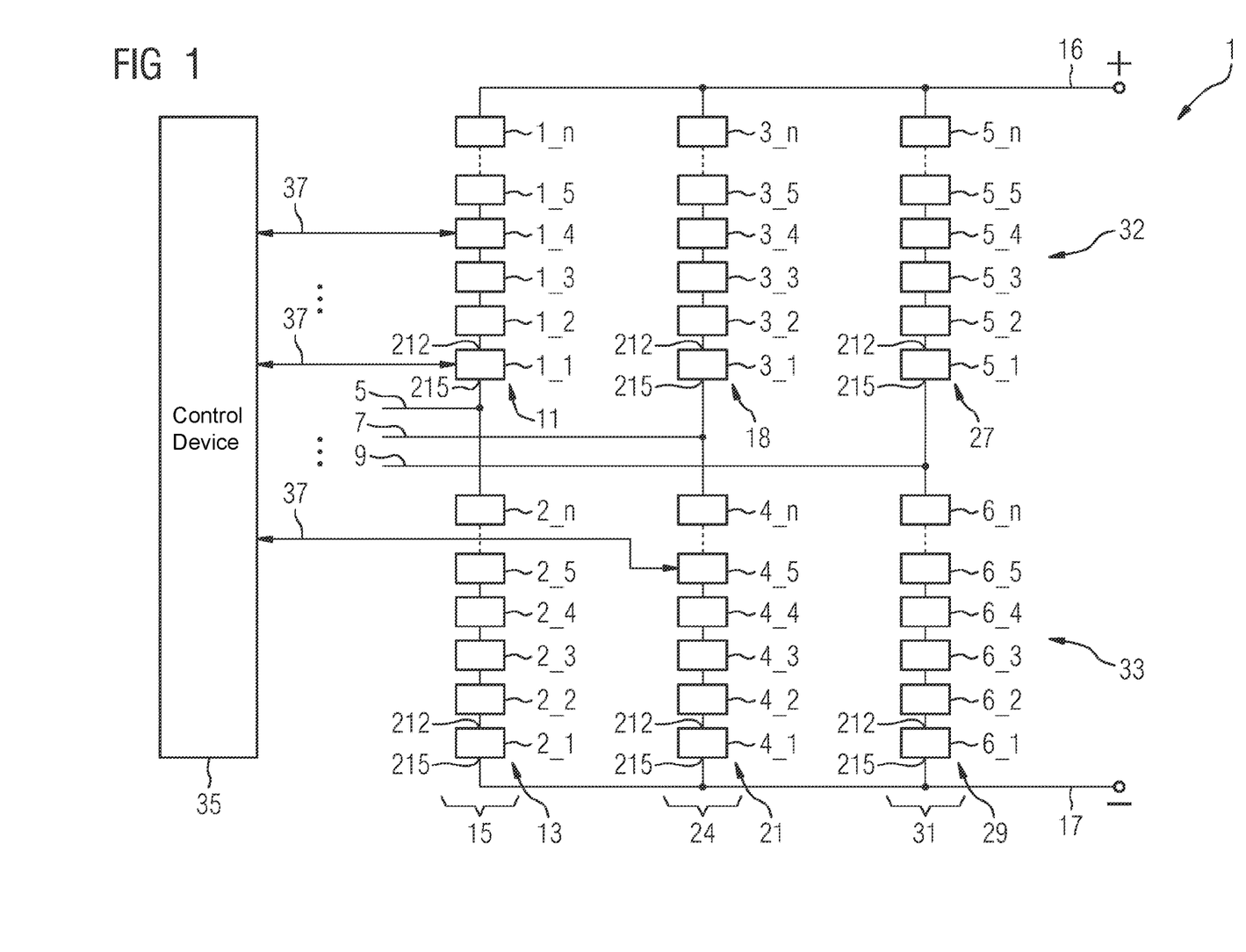
FIG. 1 illustrates an exemplary embodiment of a modular multilevel power converter.

FIG. 1 illustrates an exemplary embodiment of a power converter 1 in the form of a modular multilevel power converter 1. This multilevel power converter 1 comprises a first AC voltage connection 5, a second AC voltage connection 7 and a third AC voltage connection 9. The first AC voltage connection 5 is electrically connected to a first phase module branch 11 and a second phase module branch 13. The first phase module branch 11 and the second phase module branch 13 form a first phase module 15 of the power converter 1. That end of the first phase module branch 11 which faces away from the first AC voltage connection 5 is electrically connected to a first DC voltage connection 16; that end of the second phase module branch 13 which faces away from the first AC voltage connection 5 is electrically connected to a second DC voltage connection 17. The first DC voltage connection 16 is a positive DC voltage connection; the second DC voltage connection 17 is a negative DC voltage connection.

The second AC voltage connection 7 is electrically connected to an end of a third phase module branch 18 and to an end of a fourth phase module branch 21. The third phase module branch 18 and the fourth phase module branch 21 form a second phase module 24. The third AC voltage connection 9 is electrically connected to an end of a fifth phase module branch 27 and to an end of a sixth phase module branch 29. The fifth phase module branch 27 and the sixth phase module branch 29 form a third phase module 31.

That end of the third phase module branch 18 which faces away from the second AC voltage connection 7 and that end of the fifth phase module branch 27 which faces away from the third AC voltage connection 9 are electrically connected to the first DC voltage connection 16. That end of the fourth phase module branch 21 which faces away from the second AC voltage connection 7 and that end of the sixth phase module branch 29 which faces away from the third AC voltage connection 9 are electrically connected to the second DC voltage connection 17. The first phase module branch 11, the third phase module branch 18 and the fifth phase module branch 27 form a positive-side power converter part 32; the second phase module branch 13, the fourth phase module branch 21 and the sixth phase module branch 29 form a negative-side power converter part 33.

Each phase module branch comprises a plurality of modules (1_1, 1_2, 1_3, 1_4 . . . 1_n; 2_1 . . . 2_n; etc.) which are electrically connected in series (by means of their module connections). Such modules are also referred to as submodules. In the exemplary embodiment in FIG. 1, each phase module branch comprises n modules. The number of modules electrically connected in series by means of their module connections can vary greatly; at the very least three modules are connected in series, but it is also possible for example for 50, 100 or more modules to be electrically connected in series. In the exemplary embodiment, n=36: the first phase module branch 11 thus comprises 36 modules 1_1, 1_2, 1_3, . . . 1_36. The other phase module branches 13, 18, 21, 27 and 29 are constructed in an identical way.

A control device 35 for the modules 1_1 to 6_n is illustrated schematically in the left-hand region of FIG. 1. This central control device 35 transfers optical messages or optical signals via an optical communication link 37 (for example via an optical waveband) to the individual modules. The message transfer between the control device and a module is illustrated symbolically in each case by a line 37; the direction of the message transfer is symbolized by the arrowheads on the lines 37. This is illustrated on the basis of the example of the modules 1_1, 1_4 and 4_5; in the same way, messages are transmitted to the other modules and messages are received from these modules. By way of example, the control device 35 transmits a respective target value for the switching state of the electronic switching elements to the individual modules.

Figure 2:
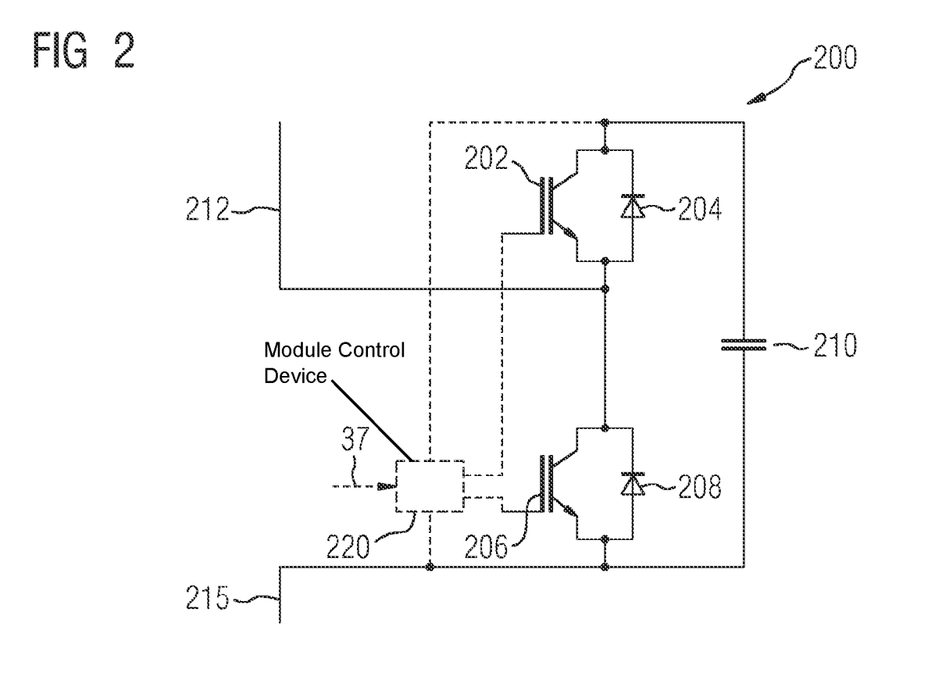
FIG. 2 illustrates an exemplary embodiment of a half bridge module of the modular multilevel power converter.

FIG. 2 illustrates an exemplary embodiment of a module 200 of the modular multilevel power converter 1. The module can be for example one of the modules 1_1 . . . 6_n illustrated in FIG. 1.

The module 200 is configured as a half bridge module 200. The module 200 comprises a first (turn-off) electronic switching element 202 (first turn-off semiconductor valve 202) with a first diode 204 connected in antiparallel. Furthermore, the module 200 comprises a second (turn-off) electronic switching element 206 (second turn-off semiconductor valve 206) with a second diode 208 connected in antiparallel, and also an electrical energy store 210 in the form of a capacitor 210. The first electronic switching element 202 and the second electronic switching element 206 are each configured as an IGBT (insulated-gate bipolar transistor). The first electronic switching element 202 is electrically connected in series with the second electronic switching element 206. A first galvanic module connection 212 is arranged at the connection point between the two electronic switching elements 202 and 206. A second galvanic module connection 215 is arranged at the opposite connection of the second electronic switching element 206 with respect to the connection point. The second module connection 215 is furthermore electrically connected to a first connection of the energy store 210; a second connection of the energy store 210 is electrically connected to the opposite connection of the first electronic switching element 202 with respect to the connection point.

The energy store 210 is thus electrically connected in parallel with the series circuit formed by the first electronic switching element 202 and the second electronic switching element 206. What can be achieved by corresponding driving of the first electronic switching element 202 and of the second electronic switching element 206 by a control device of the power converter is that between the first module connection 212 and the second module connection 215 either the voltage of the energy store 210 is output or no voltage is output (i.e. a zero voltage is output). The respectively desired output voltage of the power converter can thus be generated by way of the interaction of the modules of the individual phase module branches.

Furthermore, the half bridge module 200 comprises a module control device 220. Said module control device 220 is supplied with electrical voltage by the energy store 210. This is symbolized by lines which are illustrated in a dashed manner and which connect the module control device 220 both to the positive connection (that is the upper connection) and to the negative connection (that is the lower connection) of the energy store 220. The module control device 220 can operate only when the energy store 210 is charged to a minimum voltage which is sufficient for the internal voltage supply of the half bridge module 200, which is sufficient in particular for the internal voltage supply for the module control device 220. The module control device 220 can perform various tasks: for example, the module control device 220 receives the control signals 37 from the central control device 35 and drives the first electronic switching element 202 and the second electronic switching element 206. However, the module control device 220 can for example also detect the voltage of the energy store 210 and communicate it to the central control device 35. The module control device 220 and the associated electrical connections are illustrated by means of dashed lines because they do not belong to the power electronic part of the half bridge module, but rather to the control engineering part of the half bridge module 200. The module control device 220 is one example of an (additional) electronic circuit of the module which is supplied with voltage by the energy store 210 of the module (i.e. by means of the internal voltage supply of the module).

Figure 3:
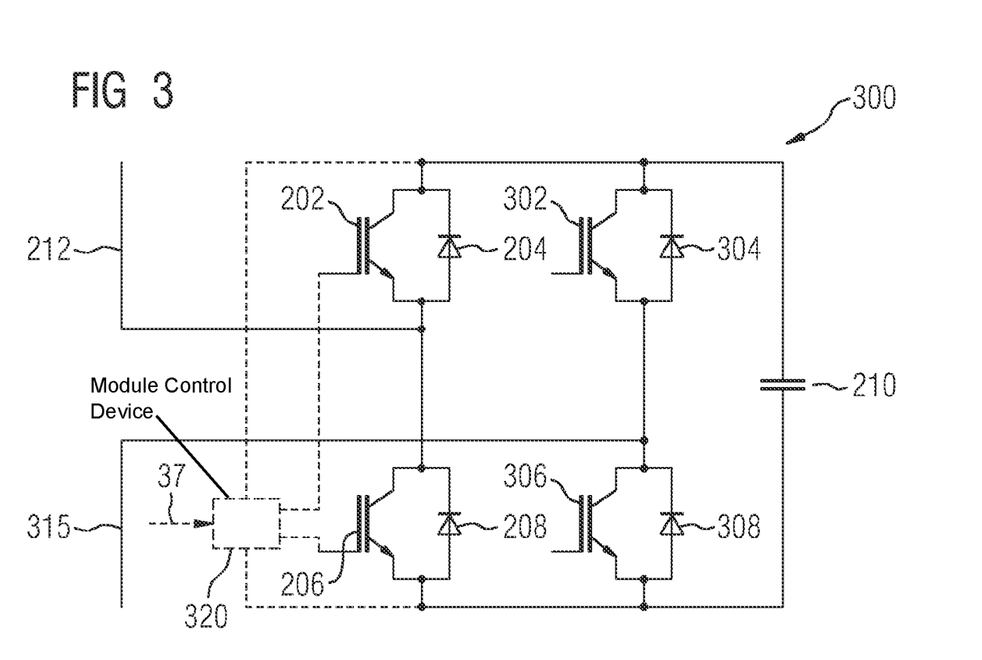
FIG. 3 illustrates an exemplary embodiment of a full bridge module of the modular multilevel power converter.

FIG. 3 illustrates a further exemplary embodiment of a module 300 of the modular multilevel power converter. The module 300 can be for example one of the modules 1_1 . . . 6_n illustrated in FIG. 1. Besides the first electronic switching element 202, second electronic switching element 206, first freewheeling diode 204, second freewheeling diode 208 and energy store 210 already known from FIG. 2, the module 300 illustrated in FIG. 3 comprises a third electronic switching element 302 with a third freewheeling diode 304 connected in antiparallel, and also a fourth electronic switching element 306 with a fourth freewheeling diode 308 connected in antiparallel. The third electronic switching element 302 and the fourth electronic switching element 306 are each configured as an IGBT. In contrast to the circuit in FIG. 2, the second module connection 315 is not electrically connected to the second electronic switching element 206, but rather to a center point (connection point) of an electrical series circuit formed by the third electronic switching element 302 and the fourth electronic switching element 306.

The module 300 in FIG. 3 is a so-called full bridge module 300. This full bridge module 300 is distinguished by the fact that upon corresponding driving of the four electronic switching elements between the first (galvanic) module connection 212 and the second (galvanic) module connection 315, optionally either the positive voltage of the energy store 210, the negative voltage of the energy store 210 or a voltage of value zero (zero voltage) can be output. Consequently, the polarity of the output voltage can thus be reversed by means of the full bridge module 300. The multilevel power converter 1 can generally comprise either only half bridge modules 200, only full bridge modules 300 or else half bridge modules 200 and full bridge modules 300.

In the same way as the half bridge module 200, the full bridge module 300 also comprises a module control device 320 supplied with electrical energy by the energy store 210. Besides the first electronic switching element 202 and the second electronic switching element 206, the module control device 320 also drives the third electronic switching element 302 and the fourth electronic switching element 306. For reasons of space, however, only the drive lines running to the first electronic switching element 202 and the second electronic switching element 206 are illustrated.

Figure 4:
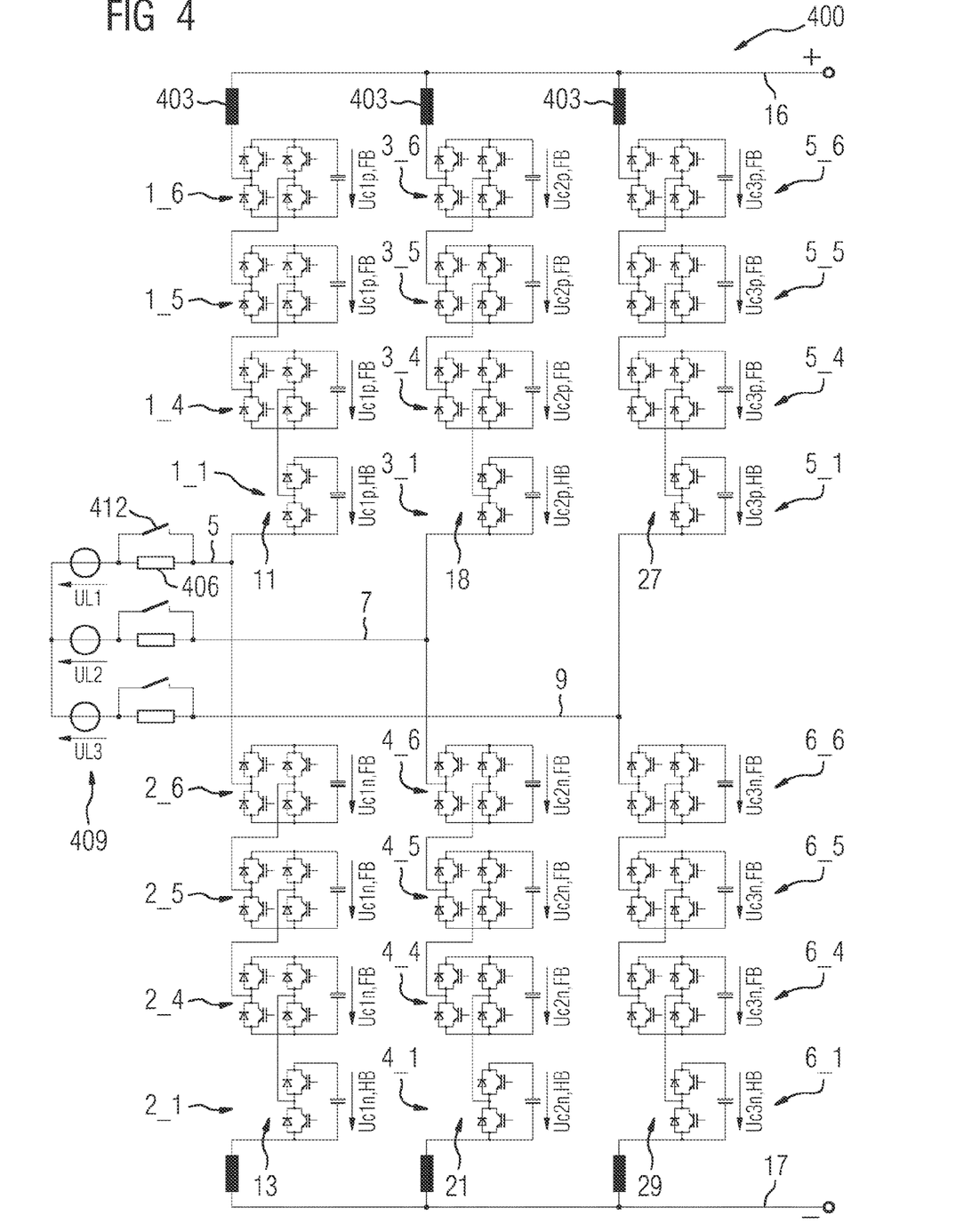
FIG. 4 illustrates an exemplary embodiment of a modular multilevel power converter comprising half bridge modules and full bridge modules.

FIG. 4 illustrates an exemplary embodiment of a modular multilevel power converter 400 comprising, in each of its sixth phase module branches, a respective series circuit formed by half bridge modules and full bridge modules. In this regard, for example, the first phase module branch 11 comprises one half bridge module 1_1 and three full bridge modules 1_4, 1_5 and 1_6 in a series circuit. In general, the series circuit comprises a larger number of half bridge modules and full bridge modules; for reasons of space, however, only one half bridge module and three full bridge modules are illustrated here.

The multilevel power converter 400 thus comprises mixed equipment with half bridge modules and full bridge modules in each phase module branch. Furthermore, the series circuit comprises an inductive component 403 (for example an inductor coil 403). The other phase module branches are constructed in the same way. At the respective energy stores of the individual modules, the voltage occurring at the energy store is illustrated in each case by means of an arrow. By way of example, the voltage Uc1p,HB occurs at the energy store of the half bridge module 1_1. In this case, Uc denotes the capacitor voltage, 1 denotes the first phase module, p denotes the positive-side converter part 32 and HB denotes half bridge module. The voltages of the energy stores of the other modules are also designated in the same way.

The three AC voltage connections 5, 7 and 9 of the multilevel power converter 400 are electrically connected to an energy supply network 409 in each case via a precharge resistor 406. Each of the precharge resistors 406 here is able to be bridged (able to be short-circuited) electrically by a bridging device 412. The energy supply network 409 is a three-phase AC voltage energy supply network 409 represented symbolically by its three phase voltages UL1, UL2 and UL3. The energy stores of the half bridge modules and of the full bridge modules are precharged by means of said AC voltage energy supply network 409. During precharging—as illustrated in FIG. 4—the bridging devices 412 are open, such that the current flows from the energy supply network 409 through the precharge resistors 406 to the modules of the multilevel power converter 400.

Figure 5:
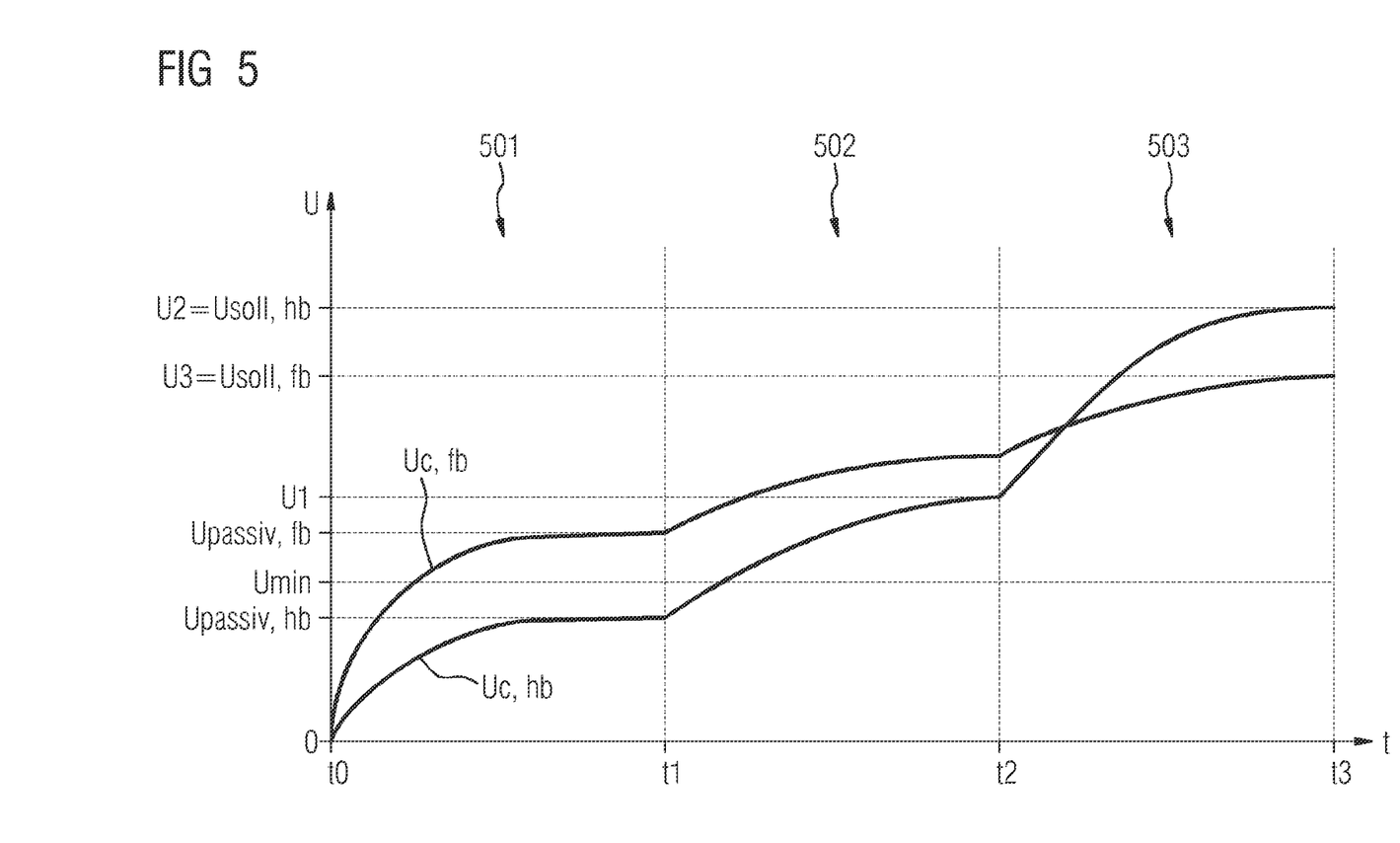
FIG. 5 illustrates an exemplary diagram illustrating the precharge process of the half bridge modules and the full bridge modules.

FIG. 5 illustrates by way of example the temporal sequence of the method for precharging the energy stores of the half bridge modules and full bridge modules. The figure illustrates both the profile of the voltage Uc,hb at the energy store of a half bridge module and the profile of the voltage Uc,fb at the energy store of a full bridge module against time t.

The first charging phase 501 takes place in the time period $t0<t<=t1$. The second charging phase 502 takes place in the time period $t1<t<=t2$ and the third charging phase 503 takes place in the time period $t2<t<=t3$. At the point in time $t=t0$, the energy stores of the half bridge modules and the energy stores of the full bridge modules are fully discharged (Uc,hb=Uc,fb=0). At the point in time $t=t0$, the multilevel power converter 400 is electrically connected to the AC voltage energy supply network 409. The energy stores of the half bridge modules and the energy stores of the full bridge modules thereupon become charged in an uncontrolled manner on account of the voltage of the AC voltage energy supply network 409. This charging proceeds according to an exponential function and is substantially determined by the ratio of the resistances of the precharge resistors 406 to the capacities of the energy stores of the individual modules. In this first charging phase, the electronic switching elements of the half bridge modules and of the full bridge modules are undriven, that is to say that the corresponding switching elements are turned off, and the current flows through the freewheeling diodes connected in antiparallel.

At the end of the first charging phase, the energy store voltage Uc,hb of the half bridge modules reaches the voltage Upassiv,hb and the energy store voltage Uc,fb of the full bridge modules reaches the voltage Upassiv,fb. "Passiv" here stands for a passive (i.e. uncontrolled) charging of the energy stores. It is evident that at the end of the first charging phase 501, the voltage of the energy stores of the full bridge modules is greater than a minimum voltage Umin (Uc,fb=Upassiv,fb>Umin) and the voltage of the energy stores of the half bridge modules is less than the minimum voltage Umin (Uc,hb=Upassiv,hb<Umin). In this case, the minimum voltage Umin is that voltage which is necessary at least for the internal voltage supply of the half bridge modules and of the full bridge modules. To put it more precisely, the minimum voltage Umin is that voltage which is at least necessary for the internal voltage supply for the electronic circuits (such as the module control devices 220 and 320, for example) additionally arranged in each case in the half and/or full bridge modules. At the end of the first charging phase 501, therefore, the full bridge modules are drivable (i.e. ready for operation), whereas the half bridge modules are not yet drivable (i.e. not yet ready for operation). Optionally (in particular in rare individual cases) the voltage of the energy stores of the half bridge modules can also be greater than the voltage Upassiv,hb at the end of the first charging phase 501.

In the second charging phase 502, the energy store voltage Uc,hb of the half bridge modules is increased, such that the energy store voltage Uc,hb is greater than the minimum voltage Umin at the end of the second charging phase 502.

In order to achieve this, in the second charging phase, at least some of the full bridge modules of the series circuit are driven in such a way that the half bridge modules of the series circuit are charged further. In this case, the respective full bridge modules are driven in such a way that the current flowing through these full bridge modules is substantially conducted past the respective energy stores of these full bridge modules. As a result, substantially the voltage zero (zero voltage) occurs between the first and second module connections of these full bridge modules. Consequently, the voltage provided by the energy supply network 409 is distributed among fewer modules of the series circuit, such that a greater effective voltage is available for the individual half bridge modules. As a result, the half bridge modules are charged further, wherein the charging can likewise be effected according to an exponential function. However, other full bridge modules of the series circuit can also be driven such that the current flows through the energy store of the respective full bridge modules and charges these energy stores further. Since the individual full bridge modules can be driven successively in such a way that at times the current is conducted past the respective energy store and at times the current flows through the respective energy store, the voltage of the energy store Uc,fb can be increased in the case of the full bridge modules, too, during the second charging phase 502. The exemplary diagram in FIG. 5 clearly reveals that at the end of the second charging phase 502 at the point in time t2, the energy store voltage Uc,fb of the full bridge modules is greater than at the beginning of the second charging phase 502 at the point in time t1. The electronic switching elements of the half bridge modules remain undriven during the second charging phase 502.

The energy store voltage Uc,hb of the half bridge modules at the end of the second charging phase (at the point in time t2) is greater than the energy store voltage of the half bridge modules at the beginning of the second charging phase (at the point in time t1). At the end of the second charging phase, in particular, the voltage Uc,hb of the half bridge modules is greater than the minimum voltage Umin. Thus, the half bridge modules can also be driven at the end of the second charging phase, i.e. both the full bridge modules and the half bridge modules are ready for operation (drivable) at the end of the second charging phase 502. The voltage Uc,hb of the energy store of the half bridge modules at the point in time t2 is thus preselected in such a way that this voltage is sufficiently high for the internal supply of the half bridge modules. This voltage Uc,hb at the point in time t=t2 is the first preselected voltage U1. At the end point in time t2 of the second charging phase 502, the voltage Uc,hb of the energy store of the half bridge modules thus has the first preselected voltage U1: Uc,hb(t2)=U1.

In the third charging phase 503, both the electronic switching elements of the half bridge modules and the electronic switching elements of the full bridge modules are driven in such a way that both the energy stores of the half bridge modules and the energy stores of the full bridge modules are charged further. To that end, the half bridge modules and the full bridge modules are driven in such a way that in the third charging phase 503, the charging current flows at times through the energy stores of the half bridge modules and at times through the energy stores of the full bridge modules. What can be achieved by means of a corresponding driving (similarly to a pulse width modulation) of the electronic switching elements is that the energy store voltages Uc,hb and Uc,fb assume preselected values at the end of the third charging phase 503. In this regard, at the end of the third charging phase 503, the voltage Uc,hb of the energy stores of the half bridge modules reaches a second preselected voltage USoll,hb and the energy store voltage Uc,fb of the full bridge modules reaches a third preselected voltage USoll,fb.

In this case, the second preselected voltage USoll,hb is the rated voltage of the half bridge modules and the third preselected voltage USoll,fb is the rated voltage of the full bridge modules. The second preselected voltage USoll,hb and the third preselected voltage USoll,fb can have different values. In the exemplary embodiment, the second preselected voltage is greater than the third preselected voltage, but the opposite can also hold true. The second preselected voltage can also be substantially equal to the third preselected voltage.

The precharging of the energy stores of the half bridge modules and of the full bridge modules is ended at the point in time t3. Both the half bridge modules and the full bridge modules are precharged to their rated voltage USoll,hb and USoll,fb, respectively. The rated operation of the multilevel power converter with driven half and full bridge modules, i.e. the energy conversion or energy transmission, can begin.

Figure 6:
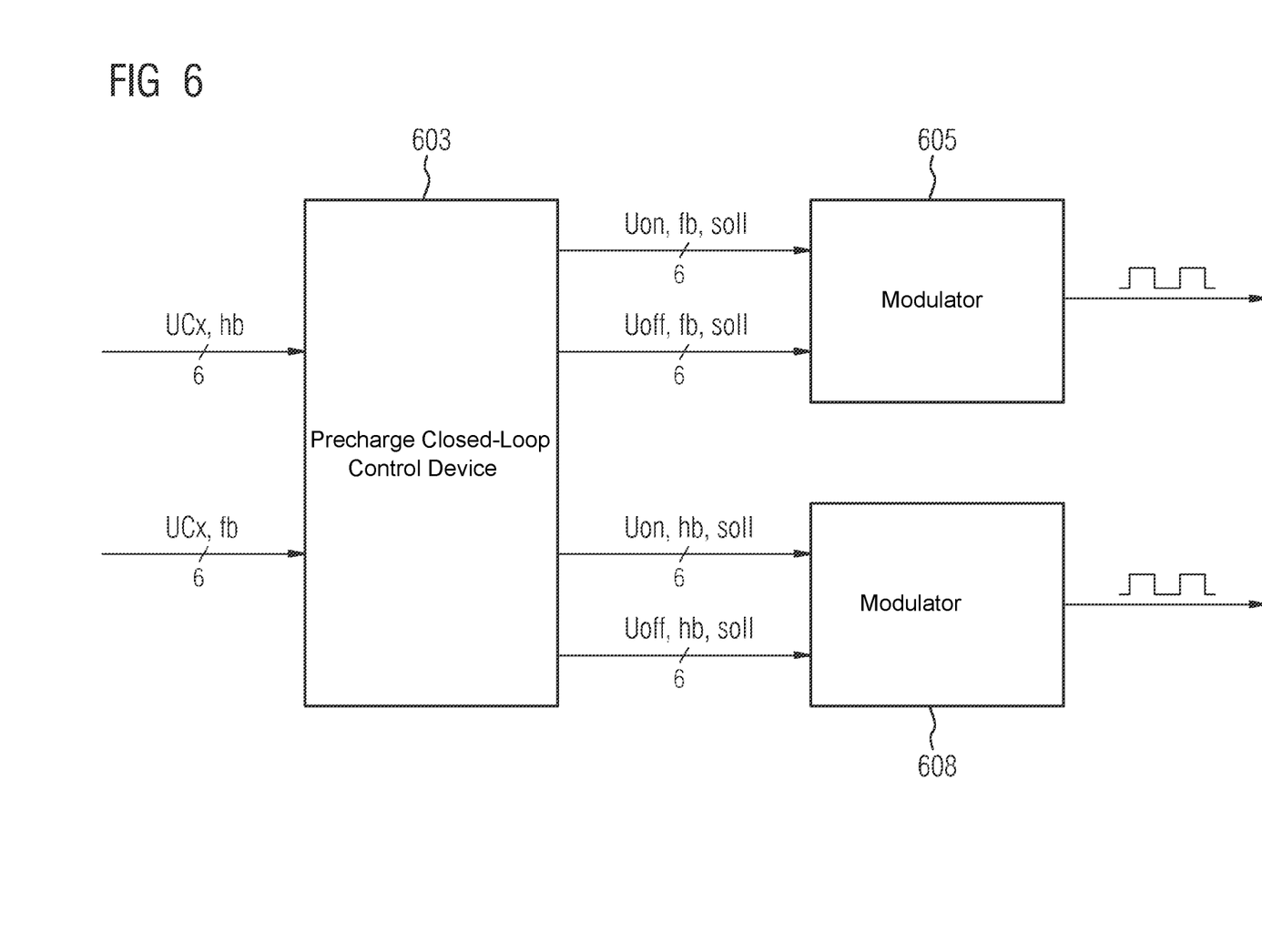
FIG. 6 illustrates an exemplary closed-loop control device for controlling the precharge method.

FIG. 6 illustrates an exemplary embodiment of a precharge closed-loop control device 603, by means of which the energy stores of the half bridge modules and of the full bridge modules of the multilevel power converter can be precharged.

As input variables, for all six phase module branches of the multilevel power converter, in each case the sum UCx,hb of the energy store voltages of all half bridge modules of the respective phase module branch and the sum UCx,fb of the energy store voltages of all full bridge modules of the respective phase module branch are fed to the precharge closed-loop control device 603. Depending on the magnitude of these summation voltages, the precharge closed-loop control device 603 determines, for each point in time and for each individual phase module branch, a so-called switch-on voltage Uon,fb,soll for the full bridge modules, a switch-on voltage Uon,hb,soll for the half bridge modules, a switch-off voltage Uoff,fb,soll for the full bridge modules and a switch-off voltage Uoff,hb,soll for the half bridge modules. The switch-on voltages Uon and the switch-off voltages Uoff here in each case specify in total a voltage which is intended to be switched in (Uon) or is intended to be switched out (Uoff) in the respective phase module branches (by means of the electronic switching elements and the energy stores of the respective modules).

The switch-on voltage Uon,fb,soll and the switch-off voltage Uoff,fb,soll are thereupon transmitted to a modulator 605 for the full bridge modules of all the phase module branches. The modulator 605 converts these target voltages into corresponding pulse patterns for the individual full bridge modules. The pulse patterns are then transmitted to the individual full bridge modules. In the same way, the switch-on voltage Uon,hb,soll and the switch-off voltage Uoff,hb,soll are transmitted to a modulator 608 for the half bridge modules of all the phase module branches. The modulator 608 converts these target voltages into corresponding pulse patterns for the individual half bridge modules. The pulse patterns are then transmitted to the individual half bridge modules. The precharge closed-loop control device 603 can also be configured as a precharge open-loop control device. The precharge closed-loop control device 603 can operate in a clocked manner, in particular; that is to say that for respective successive clock cycles, the precharge closed-loop control device 603 can determine in each case new switch-on voltages Uon and switch-off voltages Uoff.

Half bridge modules that are not yet drivable can also be precharged by the method described. Therefore, in particular the sum of the four target values Uon,hb, Uoff,hb, Uon,fb and Uoff,fb can at times be less than the sum of the capacitor voltages actually available in the respective phase module branches.

Figure 7:
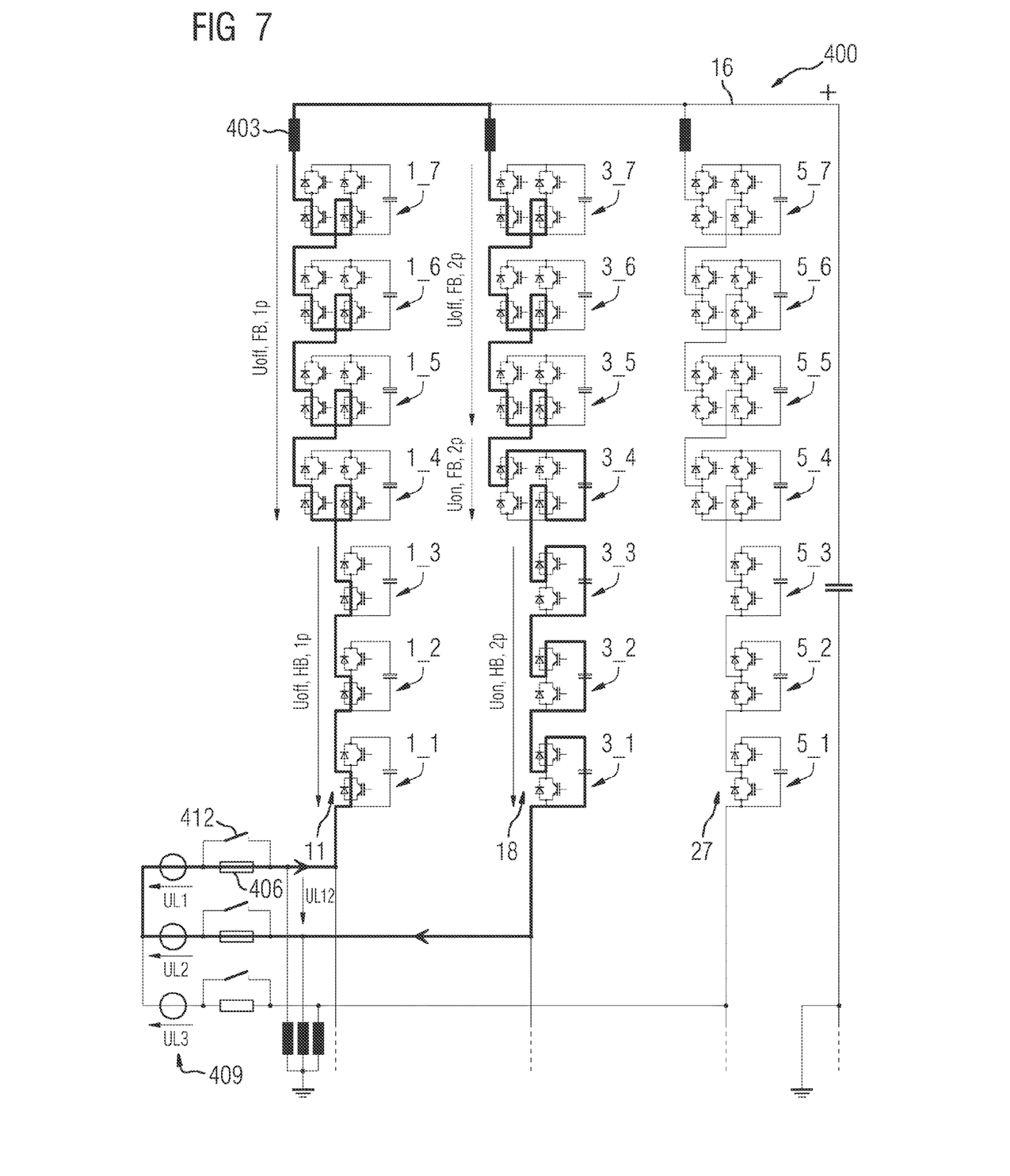
FIG. 7 illustrates a detail from the multilevel power converter from FIG. 4 with an exemplary current path during the precharge method.

FIG. 7 illustrates an exemplary snapshot of the method for precharging the energy stores of the half bridge modules and full bridge modules of the multilevel power converter 400. By comparison with FIG. 4, more modules are illustrated in FIG. 7.

An exemplary precharge current path through two phases of the power converter is marked by means of a wide line. It is evident that modules are switched on (modules 3_1, 3_2, 3_3 and 3_4) and switched off (the remaining modules) in a targeted manner. How many half bridge and full bridge modules are switched on and off in each case is predefined by the target values Uon,hb and Uon,fb and respectively Uoff,hb and Uoff,fb.

The voltage UL12 (occurring between the first phase UL1 and the second phase UL2) of the AC voltage energy supply network 409 drives a current which, proceeding from the first phase UL1 of the AC voltage network, flows through the first phase module branch 11 and the third phase module branch 18 back to the second phase UL2 of the energy supply network 409. In this case, the individual electronic switching elements of the full bridge modules and of the half bridge modules are driven such that this precharge current flows through the current path marked by means of the wide line in FIG. 7. It is evident that the current is conducted past the energy stores of the half bridge modules 1_1, 1_2 and 1_3 and past the energy stores of the full bridge modules 1_4, 1_5, 1_6, 1_7, 3_7, 3_6 and 3_5. These modules are thus driven in such a way that the voltage zero occurs in each case between the two module connections of these modules. Accordingly, a switch-off voltage Uoff is specified at these modules. In contrast thereto, the full bridge module 3_4 and the three half bridge modules 3_3, 3_2 and 3_1 are driven in such a way that the current flows through the energy stores of these modules and charges the energy stores further. Accordingly, a switch-on voltage Uon is specified at these modules.

At a subsequent point in time (in particular in a next clock cycle) of the precharge method, the individual half bridge modules and full bridge modules can be driven differently, such that the current then flows on a different current path through the half bridge modules and full bridge modules and therefore charges the energy stores of other modules.

In the example in FIG. 7, only a few half bridge modules and full bridge modules are illustrated for reasons of space. In general, more half bridge modules and full bridge modules will be present in a multilevel power converter, such that then in general more than one full bridge module is precharged simultaneously.

A description has been given of a method and a multilevel power converter with which the full bridge modules and the half bridge modules of the multilevel power converter can be reliably precharged. It is thereby possible (in preparation for rated operation of the multilevel power converter) to set the capacitor voltages both of the half bridge modules and of the full bridge modules to preselected (definable) values.

What can be achieved in this case by targeted switching of the modules (i.e. by targeted switching on and off of the half bridge modules or respectively by targeted switching off, switching on and switching on with opposite polarity of the full bridge modules) is that the sum of the module voltages of the series circuit of a phase module branch is greater than the voltage made available by the energy supply network. This is possible by means of so-called network-voltage-angle-dependent switching of the electronic switching elements of the modules, i.e. the switching elements are switched such that electric current flows further into an already partly charged energy store and the voltage of the energy store rises further as a result.

What can be achieved as a special case is that at the end of the second charging phase (at the point in time t2), the voltage of the half bridge modules and the voltage of the full bridge modules are equal in magnitude (balanced voltage division). However, the voltages can also assume values of different magnitudes.

The described method and the described power converter enable the active precharging of the energy stores of the modules of the multilevel power converter to a selectable/definable voltage value, which is an important prerequisite for the operation of such a power converter. As a result, it becomes possible to actively precharge the multilevel power converter in order subsequently to be able to commence rated operation (e.g. the energy transmission). In this case, it is possible in particular also to use half bridge modules and full bridge modules which cover their own demand from their own energy store (for example from the local capacitor) and thus cannot (actively) be driven at the beginning of the passive precharging (i.e. at the beginning of the first charging phase 501). Advantageously, for the coordinated (network-voltage-angle-dependent) driving of all six phase module branches with the half bridge modules and the full bridge modules, only one precharge resistor per phase is additionally required, which is bridgeable. Additional power electronic components are not required. The energy stores of the half bridge modules and of the full bridge modules can thus be precharged in a targeted manner.

Targeted switching of the electronic switching elements of the full bridge modules in particular prevents the full bridge modules from becoming charged further to an excessively great extent in the second charging phase 502 (particularly in the case of negative currents that flow through the full bridge modules). In the case of currents in the opposite direction (positive currents) through the full bridge modules, in particular by way of the ratio of the switched voltages of the full bridge modules and half bridge modules, the charging ratio of the energy stores of these full bridge modules and half bridge modules can be set in a targeted manner.

Use of such a multilevel power converter with half bridge modules and full bridge modules in each phase module branch enables losses during energy transmission to be significantly reduced because in particular fewer switching losses occur in the half bridge modules than in the full bridge modules.

The invention claimed is:

1. A method for precharging half bridge modules and full bridge modules of a modular multilevel power converter, the method comprising:
providing the modular multilevel power converter including at least one phase module branch having half bridge modules and full bridge modules electrically connected in a series circuit, each of the half bridge modules and full bridge modules including at least a first module connection, a second module connection, two electronic switching elements and an electrical energy store;
in a first charging phase after the multilevel power converter has been connected to an energy supply network with electronic switching elements of the half bridge modules and of the full bridge modules not being driven, charging the energy stores of the half bridge modules and of the full bridge modules in an uncontrolled manner; and in a second charging phase, driving the electronic switching elements of at least some of the full bridge modules to further charge the half bridge modules;

wherein the at least some of the full bridge modules, which are driven to further charge the half bridge modules, are not charged in the second charging phase.

2. The method according to claim 1, which further comprises selecting a number of half bridge modules and full bridge modules of the series circuit to charge the energy stores of the full bridge modules in the first charging phase to such an extent that at an end of the first charging phase, a voltage of the energy stores of the full bridge modules is sufficiently high for an internal voltage supply of the full bridge modules.

3. The method according to claim 1, which further comprises in the second charging phase, driving the electronic switching elements of at least some of the full bridge modules to substantially conduct a current flowing through the full bridge modules past respective energy stores of the full bridge modules, resulting in substantially a zero voltage occurring between the first and second module connections of the full bridge modules.

4. The method according to claim 1, which further comprises in the second charging phase, keeping the electronic switching elements of the half bridge modules undriven.

5. The method according to claim 1, which further comprises in the second charging phase, charging the energy stores of the half bridge modules until the energy stores of the half bridge modules have a first preselected voltage.

6. The method according to claim 5, which further comprises selecting the first preselected voltage to be sufficiently high for an internal voltage supply of the half bridge modules.

7. The method according to claim 5, which further comprises in a third charging phase, driving the electronic switching elements of the half bridge modules and the electronic switching elements of the full bridge modules to further charge both the energy stores of the half bridge modules and the energy stores of the full bridge modules.

8. The method according to claim 7, which further comprises in the third charging phase, further charging the electronic switching elements of the half bridge modules and the electronic switching elements of the full bridge modules until the energy stores of the half bridge modules have a second preselected voltage (Usoll,hb) and the energy stores of the full bridge modules have a third preselected voltage (Usoll, fb).

9. The method according to claim 8, wherein at least one of:
the second preselected voltage corresponds to a rated voltage (Usoll,hb) of the half bridge modules, or
the third preselected voltage corresponds to a rated voltage (Usoll, fb) of the full bridge modules.

10. The method according to claim 7, which further comprises charging the energy stores by using a precharge resistor.

11. The method according to claim 10, which further comprises connecting the precharge resistor between the energy supply network and the multilevel power converter.

12. The method according to claim 11, which further comprises electrically bridging the precharge resistor after a conclusion of the third charging phase.

13. The method according to claim 1, which further comprises providing each of the half bridge modules with two electronic switching elements in a half bridge circuit.

14. The method according to claim 13, which further comprises providing each of the full bridge modules with the two electronic switching elements and two further electronic switching elements in a full bridge circuit.

15. A modular multilevel power converter, comprising:
at least one phase module branch including a series circuit formed by half bridge modules and full bridge modules;
each of said half bridge modules and full bridge modules including at least a first module connection, a second module connection, two electronic switching elements and an electrical energy store; and
the multilevel power converter configured for carrying out the method according to claim 1.

16. The method according to claim 1, which further comprises:
in the second charging phase, charging the energy stores of the half bridge modules until the energy stores of the half bridge modules have a first preselected voltage; and
in a third charging phase, driving the electronic switching elements of the half bridge modules and the electronic switching elements of the full bridge modules to further charge the energy stores of the half bridge modules and the energy stores of the full bridge modules until the energy stores of the half bridge modules have a second preselected voltage and the energy stores of second preselected voltage the full bridge modules have a third preselected voltage that is different from the second preselected voltage.

* * * * *